(12) United States Patent
Gaedke

(10) Patent No.: US 8,107,532 B2
(45) Date of Patent: Jan. 31, 2012

(54) METHOD AND APPARATUS FOR GENERATING/EVALUATING IN A PICTURE SIGNAL ENCODING/DECODING ONE OR MORE PREDICTION INFORMATION ITEMS

(75) Inventor: Klaus Gaedke, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1081 days.

(21) Appl. No.: 11/036,663

(22) Filed: Jan. 14, 2005

(65) Prior Publication Data

US 2005/0157797 A1    Jul. 21, 2005

(30) Foreign Application Priority Data

Jan. 21, 2004  (EP) ..................... 04090022

(51) Int. Cl.
*H04N 7/12* (2006.01)
(52) U.S. Cl. ......... 375/240.12; 375/240.16; 375/240.15; 375/240.24; 375/240.01
(58) Field of Classification Search ............ 375/240.12, 375/240.16, 240.15, 240.24, 240.01
See application file for complete search history.

(56) References Cited

U.S. PATENT DOCUMENTS 5,508,744 A * 4/1996 Savatier .................. 375/240.16
6,665,342 B1 * 12/2003 Brown et al. ............ 375/240.16

OTHER PUBLICATIONS

Weigand T, "Draft Text of Final Draft International Standard for Advanced Video Coding" (ITU-T Rec. H. 264/ISO/IEC 14496-10 , Mar. 2003.
JP 10 262253 A (Nippon Telegr & Teleph Corp., Sep. 29, 1998, Patent Abstracts of Japan.
Ortega A., et al. "Forward-Adaptive Quantization with Optimal Overhead Cost for Image and Video Coding with Applications to MPEG Video Coders" Proceedings of the SPIE—International Society for Optical Engineering, 1995, vol. 2419, Feb. 5, 1995 pp. 129-138, XP008030983.
Paolo Prandoni, et al. "Optimal Bit Allocation with Side Information", pp. 2411-2414, XP-000932337, Mar. 15, 1999.
Richardson, I. E.G., "H264/MPEG-4 Part 10 White Paper—Prediction of Intra Macroblocks", Apr. 30, 2003, XP002281494, pp. 1-6.
EPO Search Report, Jun. 25, 2004.

* cited by examiner

*Primary Examiner* — Jayanti K Patel
*Assistant Examiner* — Geepy Pe
(74) *Attorney, Agent, or Firm* — Robert D. Shedd; Joseph J. Opalach

(57) ABSTRACT

Advanced Video Coding uses intra prediction for 4*4 pixel blocks whereby reconstructed samples from adjacent pixel blocks are used to predict a current block. Nine different intra prediction modes are available in AVC. In order to save bits for signalling the prediction modes, a flag and a 3-bit parameter are used. If this flag is set the most probable prediction mode, which is calculated from previous predictions, is used by the encoder and the decoder to reconstruct the actual prediction mode. If the flag is cleared, the 3-bit parameter is sent to select the prediction mode independently. According to the invention, the flag is applied more frequently, based on a prediction error threshold, instead of applying the optimum prediction mode for a current pixel block.

20 Claims, 2 Drawing Sheets

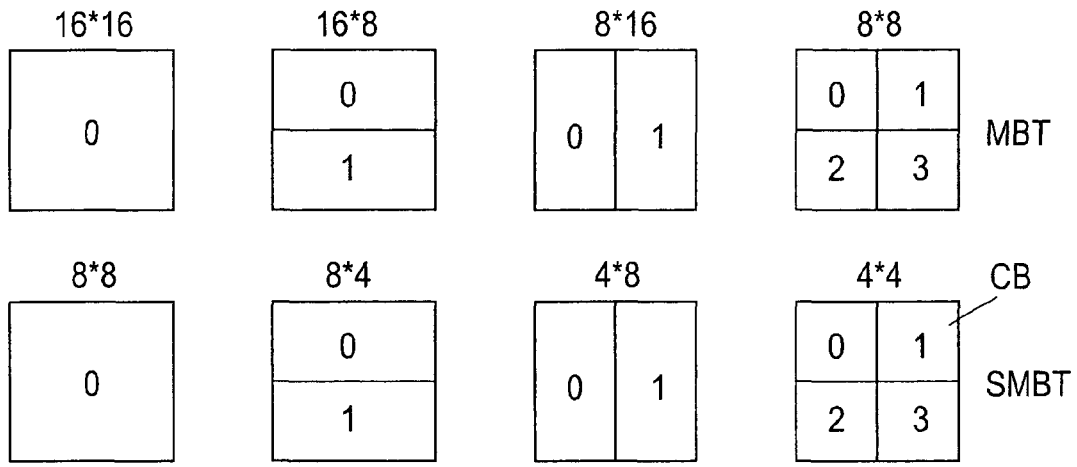
Fig.4
| 0 | Intra_4x4_Vertical (prediction mode) |
| 1 | Intra_4x4_Horizontal (prediction mode) |
| 2 | Intra_4x4_DC (prediction mode) |
| 3 | Intra_4x4_Diagonal_Down_Left (prediction mode) |
| 4 | Intra_4x4_Diagonal_Down_Right (prediction mode) |
| 5 | Intra_4x4_Vertical_Right (prediction mode) |
| 6 | Intra_4x4_Horizontal_Down (prediction mode) |
| 7 | Intra_4x4_Vertical_Left (prediction mode) |
| 8 | Intra_4x4_Horizontal_Up (prediction mode) |
Fig.5
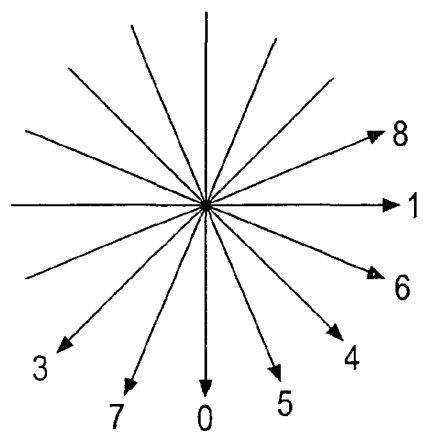
Fig.6

METHOD AND APPARATUS FOR GENERATING/EVALUATING IN A PICTURE SIGNAL ENCODING/DECODING ONE OR MORE PREDICTION INFORMATION ITEMS

FIELD OF THE INVENTION

The invention relates to a method and an apparatus for generating/evaluating in a picture signal encoding/decoding one or more prediction information items, for example in an AVC encoder or decoder.

BACKGROUND OF THE INVENTION

According to the Advanced Video Coding (AVC) standard ISO/IEC 14496-10, or MPEG-4 part 10, or H.264, the encoding may select between inter and intra coding for pixel blocks in the pictures. Inter coding uses motion vectors for block-based inter prediction between different pictures. Intra coding uses spatial predictions within a picture to exploit spatial statistical dependencies in the source signal. Motion vectors and intra prediction modes are specified for differing block sizes. The prediction residual is further compressed using a transform to remove spatial correlation inside the transform block before it is quantised. Finally, the motion vector information or the intra prediction mode information is combined with the quantised transform coefficient information and is encoded using either variable length codes or arithmetic coding.

A macroblock, consisting of a 16*16 block of luma samples and two corresponding blocks of chroma samples, is used as the basic processing unit of the video decoding process. For inter prediction a macroblock can be further partitioned down to blocks of 4*4 luma samples in size, whereby the selected size of inter prediction partitions is a trade-off between the coding gain provided by using motion compensation with smaller blocks and the quantity of data needed to represent the data for motion compensation. Motion vectors are encoded differentially with respect to predicted values formed from nearby encoded motion vectors. After inter prediction from previously decoded samples in other pictures or spatial-based prediction from previously decoded samples within the current picture, the resulting prediction residual is split into 4*4 blocks, which are converted into the transform domain where they are quantised.

The spatial intra-prediction for luminance pixel blocks (luma blocks) is based on 4*4 blocks. Intra prediction can be carried out for I and SI type macroblocks. Inputs to this process are associated values of reconstructed samples (prior to a deblocking filter operation) from adjacent luma blocks of the corresponding neighbour macroblock or from adjacent 4*4 luma blocks of the current macroblock. Outputs of this process are 4*4 luma sample arrays that are part of the 16*16 luma array of prediction samples of the macroblock.

Nine different intra prediction modes are available in AVC encoding and decoding: prediction in 8 different spatial directions and a mode denoted 'Intra_4×4_DC prediction mode'. However, intra prediction modes for neighbouring 4*4 blocks are often correlated. In order to save bits for signalling the prediction mode to be used for a current 4*4 block, a 'prev_intra4×4_pred_mode' flag and a 3-bit parameter 'rem_intra4×4_pred_mode' are used. If this flag is set, the 'most probable prediction mode' is used by the encoder and the decoder. If the flag is '0', rem_intra4×4_pred_mode is sent to indicate a change of mode (independent mode select). If rem_intra4×4_pred_mode is smaller than the current 'most probable prediction mode' then the prediction mode is set to rem_intra4×4_pred_mode, otherwise the prediction mode is set to (rem_intra4×4_pred_mode+1). In this way, only eight values of rem_intra4×4_pred_mode are required to signal the current one of the nine intra modes. The 'most probable prediction diction mode' means the minimum mode number of the prediction mode numbers for the 4*4 block to the left of the current 4*4 block and for the 4*4 block top of the current 4*4 block, respectively. If either of these neighbouring blocks is not available for prediction e.g. because it is not coded in Intra4×4 mode, to the current 4*4 block the 'Intra_4×4_DC prediction mode' is assigned.

SUMMARY OF THE INVENTION

The signalling of the rem_intra4×4_pred_mode for 4*4 luma block potentially results in an enlarged amount of signalling information bits to be transmitted from the encoder to the decoders. However, such signalling information is side information and transmitting a large amount of it reduces the available data rate for the 'pure' picture and audio information (i.e. coded transform coefficients) and reduces correspondingly the coding/de-coding picture or audio quality.

A problem to be solved by the invention is to improve, in a video encoding or decoding offering multiple pixel block intra prediction modes, the overall picture coding/decoding quality with respect to a given average or maximum data rate by reducing (on average) the necessary amount of side information to be transmitted or to be evaluated.

The invention solves this problem by means of more frequently applying the 'most probable intra-prediction mode' instead of applying the prima facie optimum intra-prediction mode for a specific picture content.

According to the above AVC standard, the video processing is based on 16*16 pixel macroblocks each including in the 4:2:0 format four 8*8 luma blocks and two 8*8 chroma blocks, but an AVC encoder can perform an intra-prediction for luma sub-blocks of the size 4*4 pixels. Thereby for each one of such 4*4 subblocks the nine different prediction modes are tested and the best match achieving the minimum prediction error, i.e. the minimum squared error, is selected as described above. According to the invention, in order to further reduce the number of bits required for transferring the required prediction mode information to the decoder, both encoder and decoder use the 'prev_intra4×4_pred_mode' flag even in cases where the most probable prediction mode as defined in the AVC standard is not to be used. In other words, not the prediction mode according to the lowest possible prediction error is used, but the above-described 'most probable prediction mode' is used even if it does not result in the best prediction match, i.e. the lowest possible prediction error. Such inventive feature can be used for all luma sub-blocks where the prediction error or miss for the most probable prediction mode is close to the best match.

The prediction error threshold, below which not the rem_intra4×4_pred_mode information (three bits per item) is transmitted but instead the 'prev_intra4×4_pred_mode' flag (1 bit) for a current 4*4 luma block, is pre-defined or can be changed adaptively according to the current type of picture content. Test with different picture material have shown that the penalty of the slightly increased prediction error is compensated for by the reduction of the number of signalling bits which must be spent for the transmission of the actual prediction mode. Thereby advantageously the required bitrate for the encoded video signal is reduced, or for a give bitrate the coding/decoding quality is improved.

In principle, the inventive method is suited for generating in a picture signal encoding one or more prediction information items required in a decoding of the encoded picture signal for the prediction of a current pixel block, said method including the steps:

either providing a first value for a prediction information item said first value indicating to use for a current pixel block a prediction mode that is to be derived from one or more prediction modes of one or more previously predicted pixel blocks that are adjacent to said current pixel block, wherein said prediction information item first value has a first word length and is for example a flag, or providing a second value for said prediction information item said second value indicating not to use for a current pixel block a prediction mode that is to be derived from one or more prediction modes of one or more previously predicted pixel blocks that are adjacent to said current pixel block, and providing the actual prediction mode value for said current pixel block, said actual prediction mode being related to the minimum prediction error for said current pixel block, wherein said actual prediction mode value has a second word length that is greater than said first word length, wherein said first value for said prediction information item is provided and not an actual prediction mode value for said current pixel block if, when applying said first value for said prediction information item instead of applying a minimum prediction error related one of the available actual prediction modes, the actual prediction error for said current pixel block is greater than when applying said minimum prediction error related prediction mode but is smaller or equal a predetermined prediction error threshold value, or is suited for intra predictinging in a picture signal decoding a current pixel block by evaluating one or more receieved prediction information items required for the prediction of said current pixel block, said method including the steps:

either evaluating a received first value for a prediction information item said first value indicating to use for a current pixel block a prediction mode that is to be derived from one or more prediction modes of one or more previously predicted pixel blocks that are adjacent to said current pixel block, wherein said prediction information item first value has a first word length and is for example a flag, or evaluating a second received value for said prediction information item said second value indicating not to use for a current pixel block a prediction mode that is to be derived from one or more prediction modes of one or more previously predicted pixel blocks that are adjacent to said current pixel block, and evaluating a received actual prediction mode value for said current pixel block, said actual prediction mode being related to the minimum prediction error for said current pixel block, wherein said actual prediction mode value has a second word length that is greater than said first word length, wherein said received first value for said prediction information item for an intra prediction of said current pixel block is applied if, when applying said first value for said prediction information item instead of applying a minimum prediction error related one of the available actual prediction modes, the actual intra prediction error for said current pixel block would be greater than when applying said minimum prediction error related prediction mode but is smaller or equal a predetermined intra prediction error threshold value.

In principle the inventive apparatus is suited for generating in a picture signal encoding one or more prediction information items required in a decoding of the encoded picture signal for the prediction of a current pixel block, said apparatus including means being adapted for:

either providing a first value for a prediction information item said first value indicating to use for a current pixel block a prediction mode that is to be derived from one or more prediction modes of one or more previously predicted pixel blocks that are adjacent to said current pixel block, wherein said prediction information item first value has a first word length and is for example a flag, or providing a second value for said prediction information item said second value indicating not to use for a current pixel block a prediction mode that is to be derived from one or more prediction modes of one or more previously predicted pixel blocks that are adjacent to said current pixel block, and providing the actual prediction mode value for said current pixel block, said actual prediction mode being related to the minimum prediction error for said current pixel block, wherein said actual prediction mode value has a second word length that is greater than said first word length, wherein said means are being adapted for providing said first value for said prediction information item and not providing an actual prediction mode value for said current pixel block if, when applying said first value for said prediction information item instead of applying a minimum prediction error related one of the available actual prediction modes, the actual prediction error for said current pixel block is greater than when applying said minimum prediction error related prediction mode but is smaller or equal a pre-determined prediction error threshold value, or is suited for intra predicting in a picture signal decoding a current pixel block by evaluating one or more received prediction information items required for the prediction of said current pixel block, said apparatus including means being adapted for:

either evaluating a received first value for a prediction information item said first value indicating to use for a current pixel block a prediction mode that is to be derived from one or more prediction modes of one or more previously predicted pixel blocks that are adjacent to said current pixel block, wherein said prediction information item first value has a first word length and is for example a flag, or evaluating a second received value for said prediction information item said second value indicating not to use for a current pixel block a prediction mode that is to be derived from one or more prediction modes of one or more previously predicted pixel blocks that are adjacent to said current pixel block, and evaluating a received actual prediction mode value for said current pixel block, said actual prediction mode being related to the minimum prediction error for said current pixel block, wherein said actual prediction mode value has a second word length that is greater than said first word length, wherein said means are being adapted for applying said received first value for said prediction information item for an intra prediction of said current pixel block if, when applying said first value for said prediction information item instead of applying a minimum prediction error related one of the available actual prediction modes, the actual intra prediction error for said current pixel block would be greater than when applying said minimum prediction error related prediction mode but is smaller or equal a predetermined intra prediction error threshold value.

BRIEF DESCRIPTION OF THE DRAWINGS

Exemplary embodiments of the invention are described with reference to the accompanying drawings, which show in:

FIG. 4 Partitioning of macroblocks and sub-macroblocks;
FIG. 5 Available 4*4 intra prediction modes in AVC;

FIG. 6 Depicted direction of the prediction for different prediction modes.

DETAILED DESCRIPTION OF PREFERRED EMBODIMENTS

Figure 1:
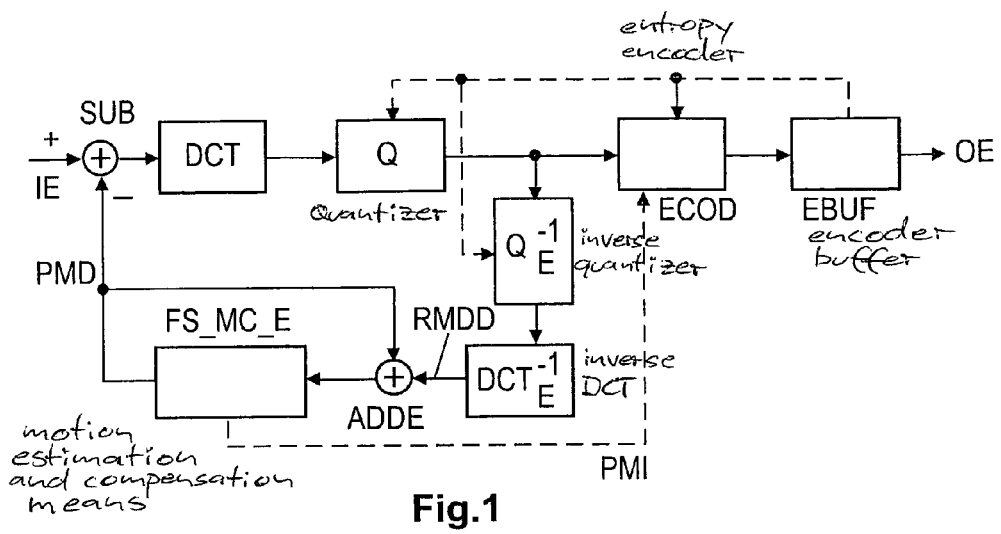
FIG. 1 Simplified block diagram of an AVC encoder.

In FIG. 1 the encoder video data input signal IE includes macroblock data to be encoded. In case of intraframe data without prediction a subtractor SUB simply passes the data via transform means DCT, e.g. discrete cosine transform means, and quantising means Q to entropy encoding means ECOD which may perform variable length encoding or arithmetic coding, and which deliver via encoder buffer EBUF the encoder video data output signal OE. In case of inter predicted data or intra predicted data, subtractor SUB subtracts predicted macroblock data PMD from the input signal and passes the difference data via transform means DCT and quantising means Q to entropy encoding means ECOD. The output signal of Q is also fed to inverse quantising means $Q_E^{-1}$, the output signal of which passes through correspondingly inverse transform means $DCT_E^{-1}$ to adder ADDE in the form of reconstructed macroblock or sub-macroblock difference data RMDD. The output signal of ADDE is intermediately stored in frame store and motion estimation and compensation means FS_MC_E which include a prediction error calculator and which also perform motion compensation on reconstructed macroblock data or reconstructed sub-macroblock data (4*4 luma block data) and which deliver predicted macroblock data or predicted 4*4 luma block data PMD to SUB and to the other input of adder ADDE. In case of inter prediction the data intermediately stored are data related to a different (e.g. the previous) picture whereas in case of intra prediction the data intermediately stored are previously processed data related to the current input picture. Quantiser Q, inverse quantiser $Q_E^{-1}$, and entropy encoder ECOD are controlled basically by the filling level of an output buffer BUF. The inventive intra prediction mode selection is carried out in motion estimation and compensation means FS_MC_E. The 4*4 intra prediction mode information PMI is added to the data-stream OE to be transmitted e.g. in entropy encoder ECOD.

Figure 2:
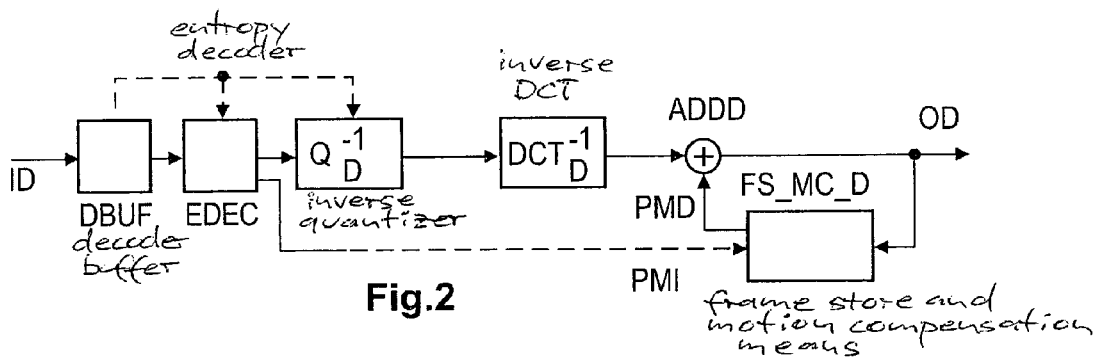
FIG. 2 Simplified block diagram of an AVC decoder.

In FIG. 2 the decoder video data input signal ID passes through decoder buffer DBUF and entropy decoding or arithmetic decoding means EDEC, inverse quantising means $Q_D^{-1}$, and inverse transform computing means $DCT_D^{-1}$, e.g. inverse discrete cosine transform means, to an adder ADDD which delivers the decoder video data output signal OD. The output signal of ADDD is fed to frame store and motion compensation means FS_MC_D which also perform motion compensation on reconstructed macroblock data or reconstructed sub-macroblock data (4*4 luma block data) and which deliver predicted macroblock data or predicted 4*4 luma block data PMD to the other input of adder ADDE. The 4*4 intra prediction mode information PMI is regained from the received datastream ID, e.g. in stage EDEC, and is used to control stage FS_MC_D correspondingly. In case of intraframe macroblock data without prediction the adder ADDD simply passes the output signal of $DCT_D^{-1}$. In case of inter predicted data the data intermediately stored are data related to a different (e.g. the previous) picture whereas in case of intra predicted data the data intermediately stored are previously processed data related to the current input picture. Inverse quantiser $Q_D^{-1}$ and entropy decoder EDEC are controlled according to the kind of control for $Q_E^{-1}$ and ECOD. Normally, in motion compensation means FS_MC_D the same motion vector information is used as in motion compensation means FS_MC_E. The inventive intra prediction mode selection is carried out in motion compensation means FS_MC_D.

Figure 3:
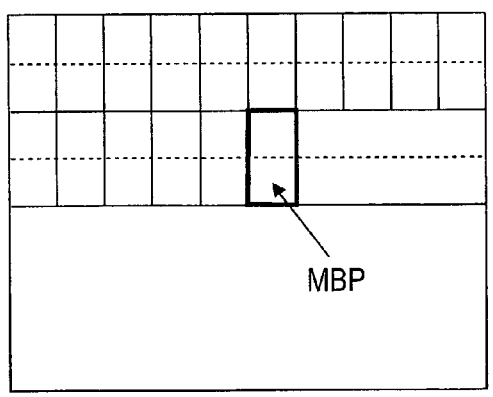
FIG. 3 Picture with a macroblock grid.

FIG. 3 shows that in AVC the pictures are composed of multiple macroblocks, from which macroblock pairs MBP can be formed in the processing.

According to FIG. 4, in an AVC system the macroblocks or sub-macroblocks may be partitioned, and the partitions are scanned for inter prediction or 4*4 intra prediction. The outer rectangles refer to the samples in a macroblock or sub-macroblock, respectively. The rectangles refer to the partitions. The number in each rectangle specifies the index of the inverse macroblock partition scan or inverse sub-macroblock partition scan. The upper part of FIG. 4 shows macroblock partitions MBT, the top right scheme showing four 8*8 sub-macroblocks per macroblock, whereas the lower part shows sub-macroblock partitions SMBT of an 8*8 sub-macroblock, the bottom right scheme showing four 4*4 luma samples blocks per sub-macroblock. One of these blocks is the current block CB in the 4*4 intra processing. To the luma samples corresponding chroma samples and chroma sample blocks are associated.

In FIG. 5 the left column shows an AVC prediction mode index '0' to '8' and the right column shows the corresponding 4*4 intra prediction modes. The corresponding prediction direction is depicted in FIG. 6, except for mode '2'. The predictions are based on associated values of reconstructed samples—prior to a deblocking filter operation—from neighbouring macroblocks. For example, index '0' denotes a vertical prediction from an adjacent 4*4 block of the adjacent upper macroblock, and index '1' denotes a horizontal prediction from an adjacent 4*4 block of the adjacent left macroblock.

Output for a 4*4 luma block are the prediction samples pred[x,y], with x, y=0 . . . 3, the position of the upper-left sample being assigned to x=O and y=O. There are 13 possible neighbouring reconstructed luma samples p[x,y], with x=−1, y=−1 . . . 3 and x=0 . . . 7, y=−1, on which the intra prediction can be based, whereby each predicted luma block is processed and constructed into the current frame prior to decoding of the next luma block.

Mode '0' (vertical prediction) is used only when the samples p[x,−1] with x=0 . . . 3 are available for the 4*4 intra prediction. The values of the prediction samples pred[x,y] are derived by pred[x,y]=p[x,−1], with x=0 . . . 3, y=0 . . . 3.

Mode '1' (horizontal prediction) is used only when the samples p[−1,y], with y=0 . . . 3 are available for the 4*4 intra prediction. The values of the prediction samples are derived by pred[x,y]=p[−1,y], with x=0 . . . 3, y=0 . . . 3.

Mode '3' (diagonal down left prediction) is used only when the samples p[x,−1] with x=0 . . . 7 are available for the 4*4 intra prediction. The values of the prediction samples are derived by (">>2" denotes an arithmetic right shift of a two's complement integer representation of the related number by 2 binary digits):

---

If x=3 and y=3, pred[x,y] =
(p[6,−1] + 3*p[7,−1] + 2) >>2 ;
Else pred[x,y] =
(p[x+y,−1] + 2*p[x+y+1,−1] + p[x+y+2,−1] + 2) >>2 .

---

Mode '4' (diagonal down right prediction) is used only when the samples p[x,−1] with x=0 . . . 3 and p[−1,y] with y=−1 . . . 3 are available for 4*4 intra prediction. The values of the prediction samples are derived by:

```
If x>y, pred[x,y] =
  (p[x-y-2,-1] + 2*p[x-y-1,-1] + p[x-y,-1] + 2) >>2 ;
Else if x<y, pred[x,y] =
  (p[-1,y-x-2] + 2*p[-1,y-x-1] + p[-1,y-x] + 2) >> 2 ;
Else pred[x,y] =
  (p[0,-1] + 2*p[-1,-1] + p[-1,0] + 2) >> 2 .
```

Mode '5' (vertical right prediction) is used only when the samples p[x,−1] with x=0 . . . 3 and p[−1,y] with y=−1 . . . 3 are available for 4*4 intra prediction. Let the variable V be set to V=2*x−y. The values of the prediction samples pred[x,y] are derived by:

```
If V=0,2,4 or 6, pred[x,y] =
  (p[x-(y>>1)-1,-1] + p[x-(y>>1),-1] + 1) >> 1 ;
If V=1,3 or 5, pred[x,y] =
  (p[x-(y>>1)-2,-1] + 2*p[x-(y>>1)-1,-1] + p[x-(y>>1),-1] + 2)
  >> 2 ;
If V=-1, pred[x,y] =
  (p[-1,0] + 2*p[-1,-1] + p[0,-1] + 2) >> 2 ;
If V=-2 or -3, pred[x,y] =
  (p[-1,y-1] + 2*p[-1,y-2] + p[-1,y-3] + 2) >> 2 .
```

Mode '6' (horizontal down prediction) is used only when the samples p[x,−1] with x=0 . . . 3 and p[−1,y] with y=−1 . . . 3 are available for 4*4 intra prediction. Let the variable V be set to V=2*y−x. The values of the prediction samples pred[x,y] are derived by:

```
If V=0,2,4 or 6, pred[x,y] =
  (p[-1,y-(x>>1) - 1] + p[-1,y-(x>>1)] + 1) >> 1 ;
Else if V=1,3 or 5, pred[x,y] =
  (p[-1,y-(x>>1) - 2] + 2*p[-1,y-(x>>1) - 1] + p[-1,y-(x>>1)]
  + 2) >> 2 ;
Else if V=-1, pred[x,y] =
  (p[-1,0] + 2*p[-1,-1] + p[0,-1] + 2 ) >> 2 ;
Else if V=-2 or -3), pred[x,y] =
  (p[x-1,-1] + 2*p[x-2,-1] + p[x-3,-1] + 2) >> 2 .
```

Mode '7' (vertical left prediction) is used only when the samples p[x,−1] with x=0 . . . 7 are available for 4*4 intra prediction. The values of the prediction samples pred[x,y] are derived by:

```
If y=0 or 2, pred[x,y] =
  (p[x+(y>>1),-1] + p[x+(y>>1)+1,-1] + 1) >> 1 ;
Else if y=1 or 3, pred[x,y] =
  (p[x+(y>>1),-1] + 2*p[x+(y>>1)+1,-1] + p[x+(y>>1)+2,-1] + 2)
  >> 2 .
```

Mode '8' (horizontal up prediction) is used only when the samples p[−1,y] with y=0 . . . 3 are available for 4*4 intra prediction. Let the variable V be set to V=x+2*y. The values of the prediction samples pred[x,y] are derived by:

```
If V=0,2 or 4, pred[x,y] =
  (p[-1,y+(x>>1)] + p[-1,y+(x>>1)+1] + 1) >> 1 ;
Else if V=1 or 3, pred[x,y] =
  (p[-1,y+(x>>1)] + 2*p[-1,y+(x>>1)+1] + p[-1,y+(x>>1)+2] + 2)
  >> 2 ;
Else if V=5, pred[x,y] = (p[-1,2] + 3*p[-1,3] + 2) >> 2 ;
Else if V>5, pred[x,y] = p[-1,3] .
```

In AVC intra_4*4_DC prediction mode '2' (DC prediction), if all samples p[x,−1] with x=0 . . . 3 and p[−1,y] with y=0 . . . 3 are available for 4*4 intra prediction, the values of the prediction samples pred[x,y] are derived by:

pred[x,y]=(p[0,−1]+p[1,−1]+p[2,−1]+p[3,−1]+p[−1,0]+p[−1,1]+p[−1,2]+p[−1,3]+4)>>3;

Otherwise, if samples p[x,−1] with x=0 . . . 3 are not available for 4*4 intra prediction and p[−1,y] with y=0 . . . 3 are available for 4*4 intra prediction, the values of the prediction samples pred[x,y] are derived by:

pred[x,y]=(p[−1,0]+p[−1,1]+p[−1,2]+p[−1,3]+2)>>2;

Otherwise, if samples p[−1,y] with y=0 . . . 3 are not available for 4*4 intra prediction and p[x,−1] with x=0 . . . 3 are available for 4*4 intra prediction, the values of the prediction samples pred[x,y] are derived by:

pred[x,y]=(p[0,−1]+p[2,−1]+p[3,−1]+2)>>2;

If all samples p[x,−1] with x=0 . . . 3 and p[−1,y] with y=0 . . . 3 are not available for 4*4 intra prediction, the values of the prediction samples pred[x,y] are derived by:
pred[x,y]=128, whereby a 4*4 luma block can always be predicted using mode '2'.

The corresponding intra prediction for chroma samples is also used for I and SI macroblock types only in AVC. Input are reconstructed chroma samples prior to the deblocking filter operation from neighbouring chroma blocks, if these are available. Output are intra prediction chroma samples for the current macroblock. Both chroma blocks (Cb and Cr) of the current macroblock use the same prediction mode. The prediction mode is applied to each of the chroma blocks separately. More details are given in the above-mentioned AVC standard.

Opposite to existing video coding standards like MPEG-2, AVC facilitates the above-described intra-prediction of macroblocks. The luma component for each macroblock can be predicted based on a prediction of the complete 16*16 pixel macroblock or based on predictions for all sixteen 4*4 pixel sub-blocks of a macroblock in nine different intra prediction modes, i.e. per macroblock 9*16=144 4*4 intra prediction mode information items are required.

If all 4*4 blocks could be coded and decoded using the 'prev_intra4x4_pred_mode' flags only, per macroblock 144 bits would be required for transferring these flags.

If all 4*4 blocks would be coded and decoded using the 'rem_intra4×4_pred_mode' 3-bit information, per macroblock 144*3=432 bits would be required for transferring such information. To reduce this potential source of increased bitrate, the AVC standard introduces the use of the above-described most probable prediction mode. Both, the encoder and the decoder calculate a most probable prediction mode for each intra predicted 4*4 pixel luma subblock.

The above-described inventive forced use of a flag or a minimum-bitlength information item indicating for a current small block the repeated application of a prediction mode derived from those used for one or more previous small blocks (leading to a non-minimum prediction error for the current small block) instead of applying a non-minimum-bitlength optimum mode information (leading to a minimum prediction error for the current small block) is applied if the prediction error for the current small block is up to about 10-15% greater than that prediction error for the current small block which would result if the optimum prediction mode would be applied. Tests have shown that this leads to an advantageous overall bit rate reduction.

In a first embodiment, the most probable prediction mode is defined like in the current version of the AVC standard (FDIS ISO/IEC 14496-10) on the above-described standardised prediction modes used for the two 4*4 luma subblocks that are located above and to the left of the current 4*4 sub-block.

In a second embodiment, the most probable prediction mode is not only based on the prediction modes of the small blocks (or subblocks) arranged to the left and on top of the current small block but also on the small block located diagonally between those both small blocks, i.e. the top left neighbour small block.

If the increased prediction error for the current subblock is still below (or equal to) the above-mentioned prediction error threshold, the encoder sets in stage FS_MC_E or in a non-depicted controller the flag indicating for the current small block the repeated application of a previous prediction mode, but does not transmit the current prediction mode information (e.g. a three-bit information) for the current luma subblock. In contrast, if the increased prediction error for the current sub-block is above (or equal to) that prediction error threshold, the encoder clears in stage FS_MC_E or in a non-depicted controller the flag indicating for the current small block the repeated application of a previous prediction mode and transmits prediction mode (or type) information to the decoder.

Depending on the information received, the decoder evaluates in stage FS_MC_D or in a non-depicted controller the flag (prev_intra4×4_pred_mode) indicating for the current small block the repeated application of a previous prediction mode and, as appropriate, calculates from the previously stored prediction modes of the two adjacent sub-blocks (first embodiment) or from the previously stored prediction modes of the three adjacent sub-blocks (second embodiment) the prediction mode for the current sub-block and carries out a corresponding intra prediction, or carries out an intra prediction based on the received prediction mode information (rem_intra4×4_pred_mode) for the current small block.

"Most probable prediction mode" means in case of the second embodiment that e.g. two of the three previously fixed prediction modes are the same.

For all luma subblocks of a current frame, the encoder calculates the sub-block prediction error for all standardised prediction modes. Normally, the prediction mode resulting from the best (i.e. smallest possible) prediction error would be used, but this approach results in a very high number of luma subblocks which are not predicted in the most probable mode. Instead, the smallest possible prediction error is compared to the prediction error resulting from the use of the most probable prediction mode. If the prediction error difference is acceptable, i.e. is below a pre-defined or programmable threshold, the most probable prediction mode is used instead of the prediction mode yielding the lowest prediction error.

The invention can also be applied to a size of n*n of the small blocks, e.g. 8*8.

What is claimed is:

1. Method for generating in a picture signal encoding one or more prediction information items required in a decoding of the encoded picture signal for the intra prediction of a current pixel block, said method including the steps: providing a first value for a prediction information item said first value indicating a prediction mode for a current pixel block that is derived from one or more prediction modes of one or more previously predicted pixel blocks that are adjacent to said current pixel block, wherein said first value of prediction information item has a first word length, providing a second value for said prediction information item said second value indicating non-use for a current pixel block of a prediction mode that is derived from one or more prediction modes of one or more previously predicted pixel blocks that are adjacent to said current pixel block, and providing an actual prediction mode value for said current pixel block, said actual prediction mode being related to the minimum prediction error for said current pixel block, wherein said actual prediction mode value has a second word length that is greater than said first word length, using said first value for said prediction information item and not an actual prediction mode value for said current pixel block when the actual prediction error for said current pixel block is greater than when applying said minimum prediction error related prediction mode but is smaller or equal to a predetermined prediction error threshold value.

2. Method according to claim 1, wherein said encoding or said decoding is of type AVC and said prediction is a 4*4 intra prediction for luminance and/or chrominance blocks.

3. Method according to claim 1, wherein said previously predicted pixel blocks that are adjacent to said current pixel block are the blocks to the left and on top of the current pixel block, or are the blocks to the left, to the top left and on top of the current pixel block.

4. Method according to claim 1, wherein said threshold is changed adaptively according to the current type of picture content.

5. Method according to claim 1, wherein the level of said threshold is selected such that the prediction error that is related to said threshold is about 10-15% greater than the minimum possible prediction error that arises when applying a corresponding one of the actually available prediction modes.

6. Method for intra predicting in a picture signal decoding a current pixel block by evaluating one or more received prediction information items required for the intra prediction of said current pixel block, said method including the steps: evaluating a received first value for a prediction information item said first value indicating to use for a current pixel block a prediction mode that is to be derived from one or more prediction modes of one or more previously predicted pixel blocks that are adjacent to said current pixel block, wherein said prediction information item first value has a first word length, evaluating a second received value for said prediction information item, said second value indicating non-use for a current pixel block of a prediction mode derived from one or more prediction modes of one or more previously predicted pixel blocks that are adjacent to said current pixel block, and evaluating a received actual prediction mode value for said current pixel block, said actual prediction mode being related to the minimum prediction error for said current pixel block, wherein said actual prediction mode value has a second word length that is greater than said first word length, using said received first value for said prediction information item for an intra prediction of said current pixel block when use of said first value for said prediction information item causes the actual intra prediction error for said current pixel block to be greater than when using said minimum prediction error related prediction mode but is smaller or equal to a predetermined intra prediction error threshold value.

7. Method according to claim 6, wherein said encoding or said decoding is of type AVC and said prediction is a 4*4 intra prediction for luminance and/or chrominance blocks.

8. Method according to claim 6, wherein said previously predicted pixel blocks that are adjacent to said current pixel block are the blocks to the left and on top of the current pixel block, or are the blocks to the left, to the top left and on top of the current pixel block.

9. Method according to claim 6, wherein said threshold is changed adaptively according to the current type of picture content.

10. Method according to claim 6, wherein the level of said threshold is selected such that the prediction error that is related to said threshold is about 10-15% greater than the minimum possible prediction error that arises when applying a corresponding one of the actually available prediction modes.

11. Apparatus for generating one or more prediction information items required for decoding an encoded picture signal for intra prediction of a current pixel block, said apparatus comprising: means adapted for (a) providing a first value for a prediction information item said first value indicating to use for a current pixel block a prediction mode that is derived from one or more prediction modes of one or more previously predicted pixel blocks adjacent to said current pixel block, wherein said prediction information item first value has a first word length, and (b) providing a second value for said prediction information item said second value indicating non-use for a current pixel block of a prediction mode derived from one or more prediction modes of one or more previously predicted pixel blocks that are adjacent to said current pixel block, and providing the actual prediction mode value for said current pixel block, said actual prediction mode being related to the minimum prediction error for said current pixel block, wherein said actual prediction mode value has a second word length that is greater than said first word length, wherein said means being adapted for providing said first value for said prediction information item and not providing an actual prediction mode value for said current pixel block when use of said first value for said prediction information item causes the actual prediction error for said current pixel block to be greater than when applying said minimum prediction error related prediction mode but is smaller or equal to a predetermined prediction error threshold value; and means responsive to the prediction information item for providing a video data output signal.

12. Apparatus according to claim 11, wherein said encoding or said decoding is of type AVC and said prediction is a 4*4 intra prediction for luminance and/or chrominance blocks.

13. Apparatus according to claim 11, wherein said previously predicted pixel blocks that are adjacent to said current pixel block are the blocks to the left and on top of the current pixel block,
or are the blocks to the left, to the top left and on top of the current pixel block.

14. Apparatus according to claim 11, wherein said threshold is changed adaptively according to the current type of picture content.

15. Apparatus according to claim 11, wherein the level of said threshold is selected such that the prediction error that is related to said threshold is about 10-15% greater than the minimum possible prediction error that arises when applying a corresponding one of the actually available prediction modes.

16. Apparatus for intra predicting in a picture signal decoding a current pixel block by evaluating one or more received prediction information items required for the intra prediction of said current pixel block, said apparatus comprising: means for providing prediction mode information; and means responsive to the prediction mode information for (a) evaluating a received first value for a prediction information item said first value indicating to use for a current pixel block a prediction mode that is to be derived from one or more prediction modes of one or more previously predicted pixel blocks that are adjacent to said current pixel block, wherein said prediction information item first value has a first word length, and (b) evaluating a second received value for said prediction information item said second value indicating not to use for a current pixel block a prediction mode that is to be derived from one or more prediction modes of one or more previously predicted pixel blocks that are adjacent to said current pixel block, and evaluating a received actual prediction mode value for said current pixel block, said actual prediction mode being related to the minimum prediction error for said current pixel block, wherein said actual prediction mode value has a second word length that is greater than said first word length, wherein said means responsive to the prediction mode information being adapted for applying said received first value for said prediction information item for an intra prediction of said current pixel block when use of said first value for said prediction information item causes the actual intra prediction error for said current pixel block to be greater than when applying said minimum prediction error related prediction mode but is smaller or equal to a predetermined intra prediction error threshold value.

17. Apparatus according to claim 16, wherein said decoding is of type AVC and said prediction is a 4*4 intra prediction for luminance and/or chrominance blocks.

18. Apparatus according to claim 16, wherein said previously predicted pixel blocks that are adjacent to said current pixel block are the blocks to the left and on top of the current pixel block, or are the blocks to the left, to the top left and on top of the current pixel block.

19. Apparatus according to claim 16, wherein said threshold is changed adaptively according to the current type of picture content.

20. Apparatus according to claim 16, wherein the level of said threshold is selected such that the prediction error that is related to said threshold is about 10-15% greater than the minimum possible prediction error that arises when applying a corresponding one of the actually available prediction modes.

* * * * *